(12) United States Patent
Kummle

(10) Patent No.: US 6,545,246 B2
(45) Date of Patent: Apr. 8, 2003

(54) PROFILING ARRANGEMENT WITH A ROLL FORMING MACHINE AND WITH A WELDING DEVICE

(75) Inventor: Ralf Kummle, Schopfheim (DE)

(73) Assignee: Dreistern-Werk Maschinenbau GmbH & Co. KG, Schopfheim (DE)

( * ) Notice: Subject to any disclaimer, the term of this patent is extended or adjusted under 35 U.S.C. 154(b) by 81 days.

(21) Appl. No.: 09/784,883

(22) Filed: Feb. 16, 2001

(65) Prior Publication Data

US 2001/0020609 A1 Sep. 13, 2001

(30) Foreign Application Priority Data

Feb. 18, 2000 (DE) .......................................... 100 07 496

(51) Int. Cl.[7] .............................................. B23K 26/00
(52) U.S. Cl. ............................ 219/121.63; 219/121.64; 219/59.1
(58) Field of Search ....................... 219/121.63, 121.64, 219/59.1, 60.2, 61, 60 A; 228/17.5, 173.4

(56) References Cited

U.S. PATENT DOCUMENTS

| | | | | |
|---|---|---|---|---|
| 3,694,617 A | * | 9/1972 | Koch et al. ........... 219/121 EB |
| 3,751,623 A | * | 8/1973 | Doublet ........................ 219/67 |
| 4,142,663 A | * | 3/1979 | Blatnik et al. .............. 228/147 |
| 4,207,453 A | * | 6/1980 | Astill ....................... 219/61.11 |
| 4,315,132 A | * | 2/1982 | Saurin et al. ......... 219/121 LD |
| 4,572,941 A | * | 2/1986 | Sciaky et al. ......... 219/121 LD |
| 4,651,914 A | * | 3/1987 | Sprung et al. .................. 228/7 |
| 4,845,326 A | * | 7/1989 | Rudd et al. .................... 219/85 |
| 4,857,697 A | * | 8/1989 | Melville ................. 219/121.63 |
| 4,905,885 A | * | 3/1990 | Hellman, Sr. ............... 228/144 |
| 5,163,225 A | * | 11/1992 | Goleby .................... 29/897.35 |
| 5,373,679 A | | 12/1994 | Goleby |
| 5,658,473 A | | 8/1997 | Ziemek |

FOREIGN PATENT DOCUMENTS

| | | |
|---|---|---|
| DE | 19630521 A1 | 2/1998 |
| DE | 19834400 C1 | 1/2000 |

* cited by examiner

Primary Examiner—M. Alexandra Elve
(74) Attorney, Agent, or Firm—Volpe and Koenig, P.C.

(57) ABSTRACT

A profiling arrangement (1) with a roll forming machine (2) including several roller-type forming tools (6) and with a welding device (3) positioned in its processing path makes possible the application of more than one weld joint to a workpiece (51, 52, 53, or 54) to be manufactured. The welding device includes a single energy source and this source is connected with at least two welding heads (9) and (10) for producing both weld joints. The energy produced by welding device (3) is divided over the individual welding heads (9 and 10). This is especially favorable in the case of a welding device (3) with a laser-beam source. The laser beam can be split into several partial laser beams and guided to the individual laser-beam welding heads.

11 Claims, 3 Drawing Sheets

PROFILING ARRANGEMENT WITH A ROLL FORMING MACHINE AND WITH A WELDING DEVICE

BACKGROUND

The present invention relates to a profiling or forming arrangement with a profiling or forming machine and with a welding device in its processing path for manufacturing a shaped workpiece formed from a sheet-metal strip, the roll forming machine exhibiting roll tools positioned one behind the other in the feeding direction of the workpiece and the roll tools being formed in each case essentially by at least two driven or freely rotating forming rollers positioned on parallel axes.

Many different types of such profiling arrangements are known and serve in forming and manufacturing a wide range of shaped workpieces, especially hollow shaped workpieces or tubes.

From DE 198 34 400 C1, a profiling arrangement with a welding device for manufacturing tubes of this type in which the initially opposing edges of the workpiece are bent toward each other and then joined together with the aid of the welding device is known. Behind the welding device in the feeding direction, additional tools are usually present for aligning and calibrating the welded workpiece.

In the case of workpiece cross-sections deviating from a tubular cross-section, it is known to form overlapping areas of the edges of the workpiece and to join these together through joint stamping. The stiffness of such shaped workpieces does not meet all requirements. It has therefore already been known to join overlapping areas on such roller-shaped workpieces through folds, which is complicated and also makes necessary additional consumption of material in the area of the fold. Such a shaped workpiece also exhibits greater weight.

The present invention is therefore aimed at providing a profiling arrangement of the type mentioned above with which shaped workpieces of greater strength or stiffness can be produced, whereby sheet material of reduced thickness can be employed without considerably increasing machine costs.

SUMMARY

In solving this seemingly contradictory problem, the above-mentioned profiling installation with a roll forming machine and a welding device is characterized by the fact that the welding device exhibits a single energy source which is connected to at least two welding heads for producing at least two weld joints on the workpiece.

In this way, shaped workpieces formed from practically endless sheet material can be provided and stabilized with two weld joints without requiring two separate correspondingly expensive and mechanically complicated welding devices. By applying two weld joints to a roller-shaped workpiece, for example, a hollow shaped workpiece with crosspiece, a considerable improvement in the stiffness of this workpiece is obtained, and overlapping areas for producing folds are simultaneously avoided so that material can also be saved in this way. Nevertheless, machine costs are kept within limits because only a single welding device is required.

The welding heads can be arranged in their operating position to act on spaced and/or directly opposing contact points of the workpiece in the area of its feed path. In this way, the workpiece is guided past these welding heads as a result of feeding especially by the roll form tools and is provided there with the desired weld joints.

Here, in the area of each of the welding heads at least one supporting roller is provided which supports or guides the workpiece in the area of the welding head and prevents swerving or deflection from the welding head. Correspondingly precise weldjoints can be developed at the intended points.

A refinement of the present invention of very considerable importance can be provided in that the welding apparatus includes a laser-beam source or a high-frequency generator and in the fact that the energy delivered thereby is divided and can be fed to the individual welding heads. In this way, one can especially well realize the idea of supplying and operating at least two welding heads using only a single energy source for the welding device, i.e., applying at least two weld joints to a roller-shaped workpiece for appropriate stabilization thereof using only a single energy source. For example, a hollow shaped workpiece with crosspiece can be formed in this way and can be welded at both cross-sectional ends of the crosspiece, which provides a two-chamber hollow shaped workpiece of great stiffness.

It is especially favorable if the welding device includes a laser-beam source and has prisms and/or mirrors for splitting the laser beam and guiding it to the laser welding heads. The welding energy can thus be optically split upon use of a laser welding device, which also makes possible a correspondingly simple guiding to the welding heads independent of their arrangement.

The partial beams developing as a result of splitting the laser beam coming from the laser-beam source can also be conducted at least partially via light guides.

In this way, a welding device with a laser-beam source proves to be especially suitable for realizing the present invention.

The welding device exhibiting a high-frequency generator can include at least two oscillating circuits for dividing the high-frequency energy, which can be fed to welding heads designed as sliding contacts. In this way, the welding device can also be operated via high frequency.

The profiling installation provided with a welding device having a laser-beam source can be appropriately developed in the direction that interrupters are provided in the individual laser-beam paths for simultaneous or chronologically offset interruption of each of the partial laser beams in producing stitched weld joints. In many cases, it can namely suffice to produce stitched weld joints, i.e., not uninterrupted continuous weld joints, but rather, only sectioned weldjoints. Beyond this, the possibility of interrupting the weldjoint also permits, interrupting the feeding of the finished workpiece in order, for example, to cut it into specific lengths.

The welding energy can be adapted to different feeding rates of the workpiece in the sense that the welding heads can be supplied with less welding energy during slow feeding, for example, in a phase of acceleration of the workpiece, with more energy during subsequent feeding at maximum speed, and again with less energy during reduction of the feeding speed down to stoppage and in the sense that the supply of welding energy can be turned off or is turned off just before or upon coming to a stop.

While continuous processing takes place during normal operation with constant feeding, a discontinuous course of operation with alternating feeding and stopping can be carried out due to this possibility for adapting the current welding energy to different feeding rates. As already mentioned, the stopping can be utilized, for example, for cutting off a certain portion of the finished workpiece, the profiling arrangement then usually includes a cutting or separating mechanism behind the welding device and appropriately also behind the calibrating or straightening device.

Saving of energy during the welding process can be attained especially during processing of relatively thick workpieces through the fact that the roll forming machine includes coining rolls for coining material attenuations in the workpiece in the area of the subsequent weld joint or weld joints. Due to this coining, the point to be welded then has a shorter cross-sectional dimension compared to the actual material thickness so that correspondingly less welding energy suffices for welding and/or a greater feeding and welding speed can be selected.

Depending on the shape of the workpiece to be formed and multiply welded, the welding heads operated especially with partial laser beams can be arranged on both sides of the shaped workpiece produced by the roll forming machine and can thus act in opposing directions and face each other or they can be offset in the feeding direction or with respect to height and/or they can be adjustable in these different positions. The splitting up of the welding energy, especially a laser beam, thus permits an especially appropriate adaptation of the welding heads to the most widely varying shapes of the workpiece to be produced. For example, a double-T profile can be formed which exhibits an overlapping of sheet metal and a weld joint in the area of its central segment under each of the two crosspieces. However, the crosspieces, which can be formed here of a double layer of bent sheet metal, can also in turn exhibit a hollow cross-section in order to attain appropriate stiffness in several directions.

The welding heads can be positioned according to the side on which the overlapping to a connecting segment is appropriate.

A further possibility for saving welding energy and/or increasing the feeding speed of the workpiece can be provided in that the welding heads can be moved in the feeding direction of the workpiece and can be moved back again after a predetermined or adjustable distance, the speed of movement of the welding heads in the feeding direction being less than the feeding speed of the workpiece. In this way, a portion of a weldjoint can be produced with less energy at the welding head in each case in line with the movement of the welding head even though a correspondingly stable weldjoint can be produced since the effective period in this area of the weld is correspondingly longer due to the movement of the welding head with the workpiece in the feeding direction. Here, for example, two welding heads can be alternately active and returnable so that always the welding head moving in the feeding direction produces a weld joint. However, they can also be simultaneously first moved in the feeding direction and then back again, for example, in forming two stitched weldjoints. The lengthened effective time on the workpiece as a result of the accompanying movement of the welding heads can also be utilized in increasing the feeding speed of the workpiece.

Especially upon combination of a few or several of the above-described features and measures, a profiling arrangement is obtained with a roll forming machine and a welding device with which longitudinally welded workpieces or tubes can be provided with two or more weld joints which can be designed as a stitched joint or as a continuous joint. Since the welding energy produced in the welding device is split up, a considerable saving of weight and costs is possible in that, in spite of possible material savings, a greater stiffness and torsional strength of the shaped workpiece to be produced can be attained through the introduction of multiple weld joints. Nevertheless, there is practically no additional expense for equipment compared to a profiling installation with one welding device.

BRIEF DESCRIPTION OF THE DRAWINGS

An embodiment of the present invention is described in more detail below on the basis of the drawings. In the drawings, in schematic representation.

DETAILED DESCRIPTION OF THE PREFERRED EMBODIMENTS

A profiling arrangement designated as a whole by 1 is provide which includes a roll forming machine 2 and a welding device positioned in its processing path and designated as a whole by 3. The arrangement serves in manufacturing shaped workpieces 51, 52, 53, or 54 formed from a sheet-metal strip 5 and represented in FIGS. 4–7, with additional workpiece cross-sections also being possible.

Figure 1:
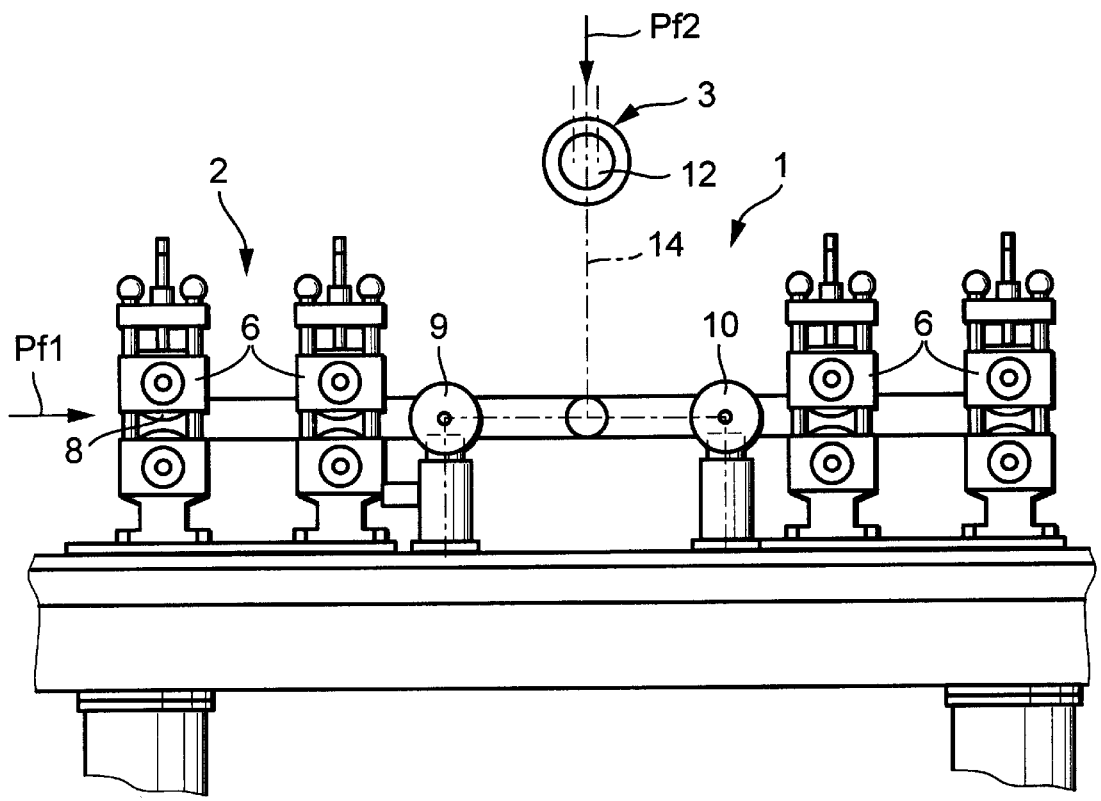
FIG. 1 is a lateral view of a profiling arrangement with several roller-type forming tools of a roll forming machine and an intermediary welding device having a laser basis.
Figure 2:
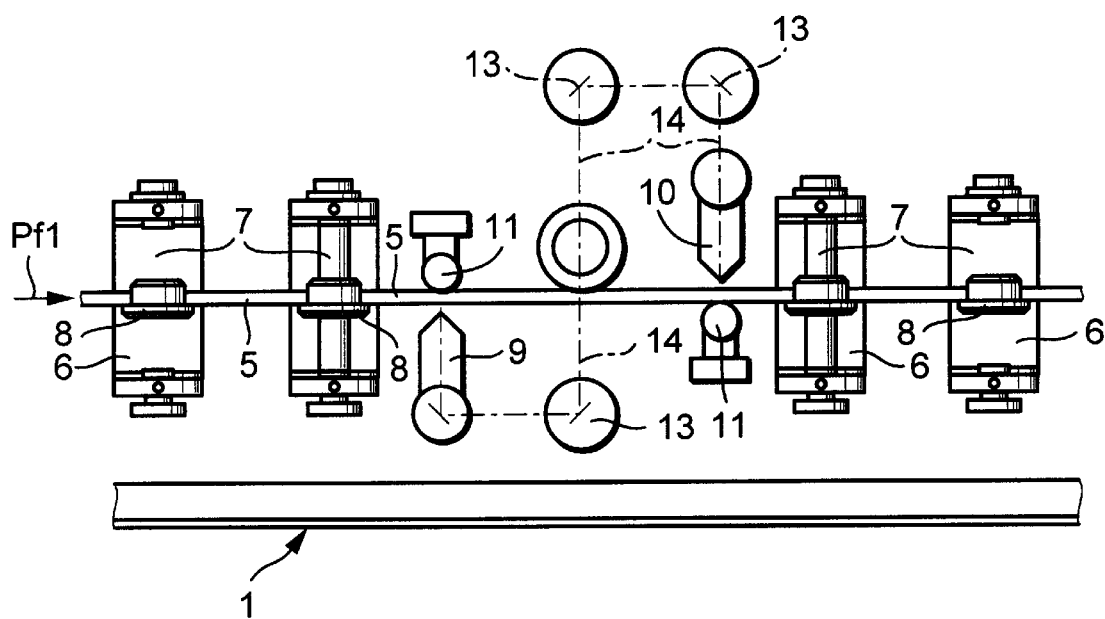
FIG. 2 is a top view of the profiling arrangement according to FIG. 1 with deflecting mirrors for guiding the split laser beam to two offset welding heads.

The roll forming machine 2 includes tools 6 positioned one behind the other in the feeding direction of the workpiece 5 indicated by arrow Pf1. The tools include, in each case, at least two driven or freely rotating forming rollers 8 arranged on parallel axes 7. In FIGS. 1 and 2, one recognizes such tools 6 both ahead of as well as behind welding device 3, the tools 6 located ahead of the welding device 3 in the feeding direction forming the actual workpiece while the tools 6 located behind the welding device 3 serving in calibrating and/or aligning the welded workpiece.

Figure 3:
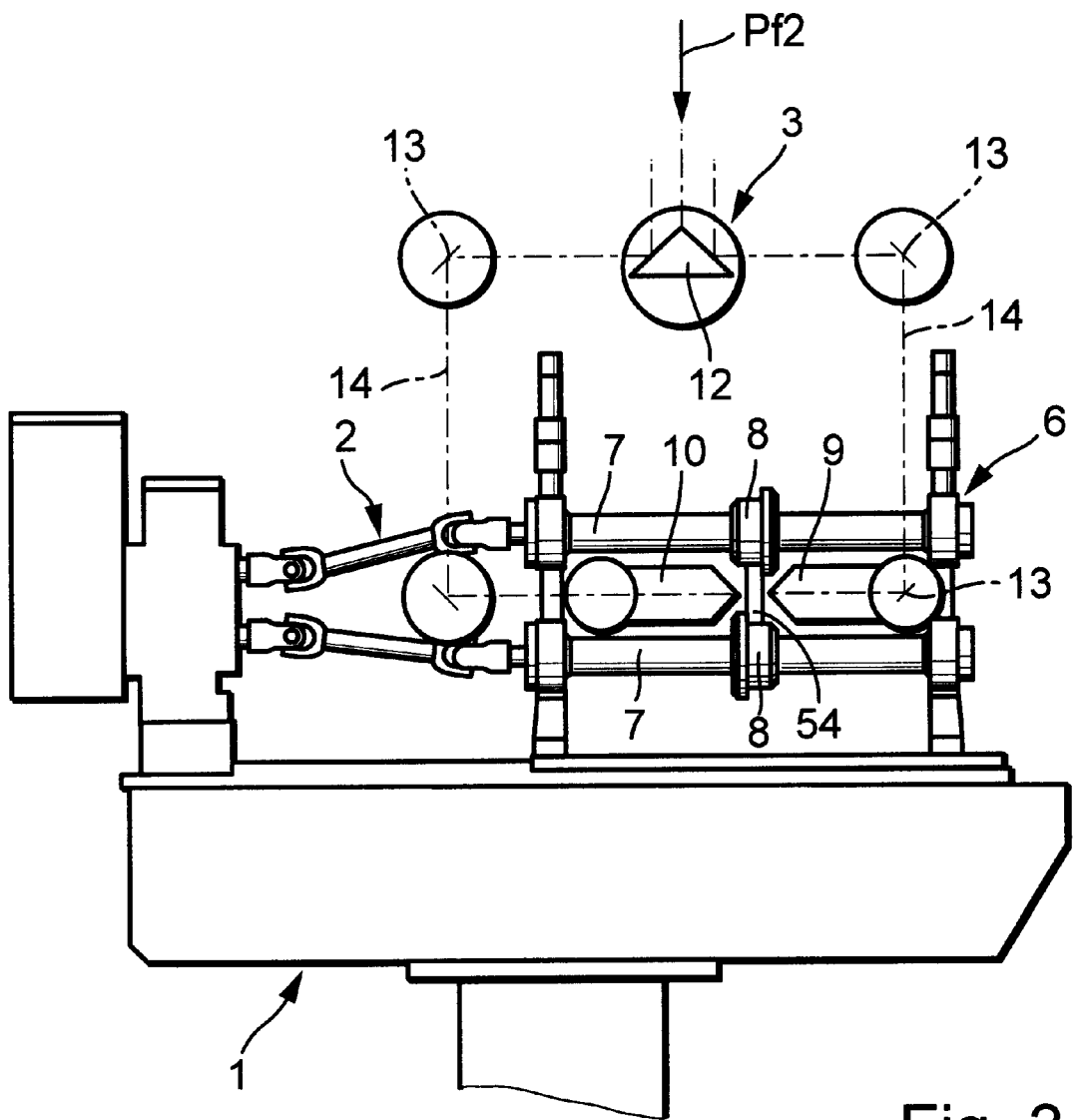
FIG. 3 is a view of the profiling arrangement in the feeding direction in the area of the welding device with a prism for splitting a laser beam.

In FIGS. 1–3, arrow Pf2 indicates that the welding device 3 exhibits a single energy source, in the present embodiment, a laser-beam source, which is connected with at least two welding heads 9 and 10 for producing at least two weld joints in the workpiece 5. Welding heads 9 and 10 are arranged here in the operating position to act on spaced contact points of the workpiece 5 in the area of its feed path, as one recognizes especially upon simultaneous viewing of FIGS. 2 and 3. A supporting roller 11 is positioned in each case on the side of the workpiece 5 opposite the welding head 9 or 10 in order to hold workpiece 5 in aligned fashion in the area of application of the weld joint.

As was already mentioned, welding device 3 includes a laser-beam source, which is not described in detail, and contains according to FIGS. 2 and 3 a prism 12 as well as several mirrors 13 in order to split the laser beam exiting the laser-beam source and to guide it to the individual laser welding heads 9 and 10. The path of a laser beam 14 is indicated in FIGS. 1–3 by dot-dash lines. Two welding heads 9 and 10 can thus be simultaneously operated using only one laser-beam source. If necessary, the partial beams 14 resulting from the splitting of the laser beam can also be guided at least to some extent via light guides.

It should be mentioned that the welding device 3 could also exhibit a high-frequency generator whose energy is divided and fed to the individual welding heads 9 and 10, such a high-frequency generator of such a welding device then exhibiting at least two oscillating circuits for dividing up the high-frequency energy, which could be fed to the welding heads 9 and 10 designed as sliding contacts.

Interrupters, which are not described in greater detail, can be provided in the two laser-beam paths for simultaneous or chronologically offset interruption of each of the partial laser beams in producing stitched weld joints. In addition, the welding energy can be adapted to different feeding speeds of the workpiece 5 in the sense that less energy is supplied to the welding heads 9 and 10 during slow feeding, for example, in an acceleration phase following stopping of workpiece 5, more or maximum energy is supplied during subsequent feeding at maximum feeding speed, and less energy is again supplied during a reduction of the feeding speed. Just before or upon stopping the feeding, the supply of welding energy can be completely cut off. In this way, continuous uninterrupted weldjoints can be produced with the profiling arrangement 1 when a corresponding continuous feeding and continuous production of the workpieces takes place; however, also possible is a discontinuous mode of operation in which the feeding is interrupted over and over again, for example, in order to cut off workpiece sections after completing their production.

In the preferred embodiment, the welding heads 9 and 10 supplied with partial laser beams are arranged on both sides of the workpiece 5 or workpiece 51–54 produced by the roll forming machine 2 and thus act in opposing directions and face each other. However, they are provided here at the same height. In this way, one can apply opposing weld joints, e.g., on the workpiece 54 according to FIG. 7 or even on the workpiece according to FIG. 6.

Figure 4:
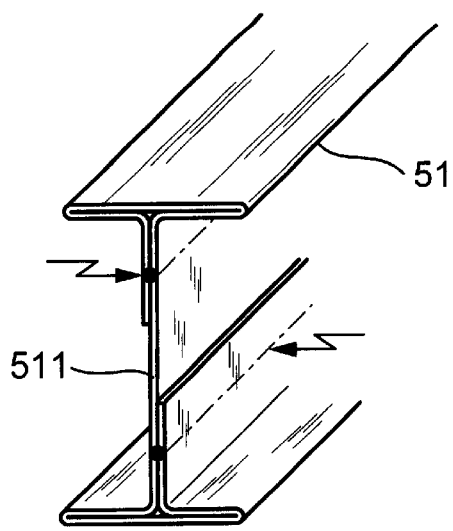
FIGS. 4–7 are perspective views of four examples of shaped workpieces manufactured from a sheet-metal strip with the aid of the profiling installation according to FIGS. 1–3, the workpieces in each case including two weld joints and the corresponding welding heads for producing the weld joints being indicated by "flash marks".

The welding heads 9 and 10, however, can also be provided at different heights in order to be able to weld a double-T workpiece 51 according to FIG. 4 after appropriate roll forming in overlapping areas of the central segment 511.

Figure 5:
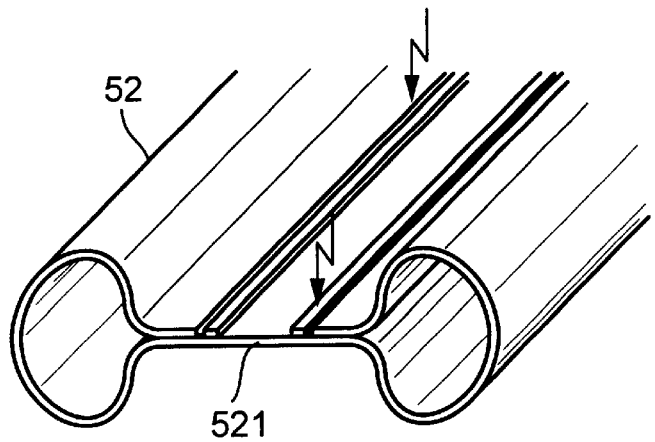

FIG. 5 shows an example in which overlapping areas of a central segment 521 lie on the same side so that, in this case, the two welding heads 9 and 10 are positioned on the same side of the workpiece 52, but offset with respect to each other in height and also appropriately in the feeding direction. It is thus advantageous if the welding heads 9 and 10 are adjustable in the profiling arrangement 1.

The examples of workpieces 51, 52, 53, and 54 displayed in FIGS. 4–7 show how two weld joints can be appropriately applied in each case to the workpiece 5 in the arrangement 1 using only a single welding device 3 in order to provide the workpiece with high stiffness and stability.

FIG. 4 shows a double-T workpiece 51 which was formed from a sheet-metal strip, each of the sheet-metal edges forming overlapped areas in central segment 511 and being welded there.

FIG. 5 shows a workpiece 52 similar to that in FIG. 4, in which, however, hollow sections are provided on both sides of the central segment 521 and the overlappings of the edges of the original sheet-metal strip are positioned on the same side of the central segment 521.

It is additionally indicated in this figure that the area of the weld joint can be previously stamped so that the material cross-section is reduced in the area of the weldjoint and welding energy is saved as a result. This can be appropriately effected through the fact that one or more coining rolls are provided in the roll forming machine 2 ahead of the welding device 3 viewed in the feeding direction for coining this material attenuation. This is especially appropriate if the starting material is relatively thick, which would require a lot of welding energy without such coining.

Figure 6:
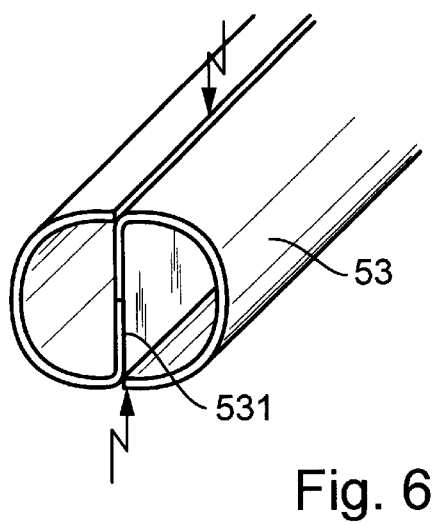

FIG. 6 shows a tube 53 with an interior crosspiece, which is formed by an approximately S-shaped profiling, the two original edges ending in each case in the area of central crosspiece 531 and being welded there.

Figure 7:
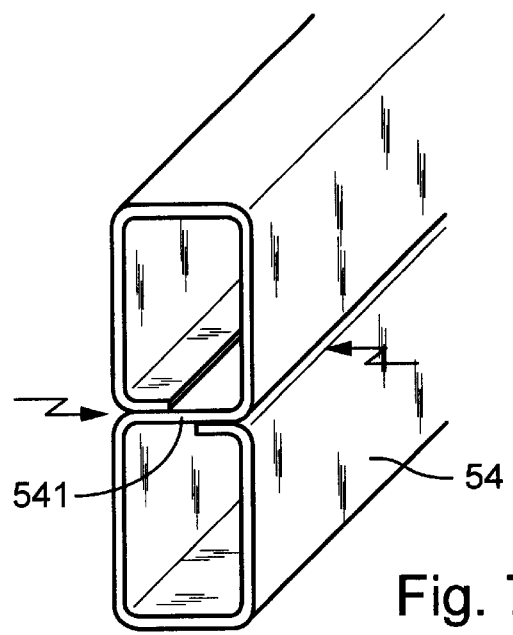

Comparable with the arrangement according to FIG. 6 is workpiece 54 according to FIG. 7, there further being overlapped regions in the area of the central crosspiece 541 and the cross-sections of the individual chambers of this hollow workpiece 54 having a rectangular shape, which leads to especially high stiffness and torsional strength.

It is clear in the examples according to FIGS. 4–7 that it can be advantageous in many cases of workpieces formed from a sheet-metal strip to weld especially the original edges of the starting material in an overlapping or contact area so that corresponding to these two original edges, two weldjoints can also be advantageous. Additional workpiece crosssections are also possible, however, in which even three or more weld joints can make sense so that still further dividing up of the welding energy of welding device 3 and distribution to correspondingly more welding heads are possible.

The profiling arrangement 1 with a roll forming machine 2 including several roller-type forming tools 6 and with a welding device 3 positioned in its processing path makes possible the application of more than one weldjoint to a workpiece 51, 52, 53, or 54 to be manufactured, the welding device having a single energy source and this source being connected with at least two welding heads 9 and 10 for producing both weld joints. The energy produced by welding device 3 is divided over the individual welding heads 9 and 10. This is especially favorable in the case of a welding device 3 with a laser-beam source. The laser beam can be split into several partial laser beams and guided to the individual laser-beam welding heads.

What is claimed is:

1. Profiling arrangement (1) comprising a roll fording machine (2) and a welding device (3) located along a processing path for manufacturing a shaped workpiece formed from a sheet-metal strip (5), the roll forming machine (2) including roll-tools (6) positioned one behind the other in a feed direction of the workpiece (5), the roll-tools comprising at least two driven or freely rotating forming rollers (8) positioned on parallel axes (7), the welding device (3) including a single energy source which is connected to at least two welding heads (9,10) adapted to produce at least two weld joints on the workpiece (5), the welding device (3) includes a laser-beam source and the energy delivered is divided and can be fed to the individual welding heads (9,10).

2. Profiling arrangement according to claim 1, wherein the welding heads (9,10) are arranged in an operating position to act on spaced and/or directly opposing contact points of the workpiece (5) in an area of a feed path.

3. Profiling arrangement according to claim 1, wherein at least one supporting roller (11) is positioned in an area of each of the welding heads (9,10).

4. Profiling arrangement according to claim 1, further comprising prisms and/or mirrors for splitting the laser beam into partial laser beams and guiding the partial laser beams to the laser welding heads (9,10).

5. Profiling arrangement according to claim 4, wherein interrupters are provided in individual laser-beam paths for simultaneous or chronologically offset interruption of each of the partial laser beams (14) to produce stitched weld joints.

6. Profiling arrangement according to claim 1, wherein the welding energy can be adapted to different feeding rates of the workpiece (5) by supplying the welding heads (9,10) with less welding energy during slow feeding, in an acceleration phase, with more energy during subsequent feeding at maximum speed, and again with less energy during reduction of the feeding speed down to stoppage and in the sense that the supply of welding energy is adapted to be turned off or is turned off just before or upon coming to a stop.

7. Profiling arrangement according to claim 1, wherein the roll forming machine includes coining rolls for coining material attenuations in the workpiece in the area of the subsequent weld joint.

8. Profiling arrangement according to claim 1, wherein the welding heads (9,10) are movable and adaptable to different workpiece cross-sections and/or different positions of the weld joints on various manufactured workpieces.

9. Profiling arrangement according to claim 1, wherein the welding heads (9,10) are arranged on both sides of the shaped workpiece produced by the roll forming machine (2) and act in opposing directions and face each other or are offset in the feeding direction or with respect to height and/or are adjustable in these different positions.

10. Profiling arrangement according to claim 1, wherein the welding heads (9,10) are movable in a feed direction of the workpiece and can be moved back again after a predetermined or adjustable distance, the speed of movement of the welding heads (9,10) in the feed direction being less than a feed speed of the workpiece.

11. Profiling arrangement according to claim 10, wherein the welding heads (9,10) are alternately movable and active in the feed direction or simultaneously movable and active in the feed direction.

* * * * *